US011593556B2

(12) United States Patent
Shrivastava et al.

(10) Patent No.: US 11,593,556 B2
(45) Date of Patent: Feb. 28, 2023

(54) METHODS AND SYSTEMS FOR GENERATING DOMAIN-SPECIFIC TEXT SUMMARIZATIONS

(71) Applicant: MASTERCARD INTERNATIONAL INCORPORATED, Purchase, NY (US)

(72) Inventors: Diksha Shrivastava, Indore (IN); Ankur Saraswat, Gurgaon (IN); Aakash Deep Singh, Ladwa (IN); Shashank Dubey, Jabalpur (IN); Yatin Katyal, Rohtak (IN)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 0 days.

(21) Appl. No.: 17/306,118

(22) Filed: May 3, 2021

(65) Prior Publication Data
US 2021/0374338 A1    Dec. 2, 2021

(30) Foreign Application Priority Data

May 26, 2020    (IN) .............................. 202041021887

(51) Int. Cl.
*G06F 40/216* (2020.01)
*G06F 40/30* (2020.01)
(Continued)

(52) U.S. Cl.
CPC ............ *G06F 40/216* (2020.01); *G06F 40/30* (2020.01); *G06F 40/56* (2020.01); *G10L 15/22* (2013.01);
(Continued)

(58) Field of Classification Search
CPC ........ G06F 40/216; G06F 40/30; G06F 40/56; H04L 12/282; G10L 15/22; G10L 15/26; G10L 17/20; G10L 2015/228; G10L 25/48
See application file for complete search history.

(56) References Cited

U.S. PATENT DOCUMENTS 10,861,456 B2 * 12/2020 Tran ......................... G10L 15/22
11,062,087 B2 *  7/2021 Srinivasan ............ G06F 40/258
(Continued)

FOREIGN PATENT DOCUMENTS

CN    109885673 A * 6/2019

OTHER PUBLICATIONS

Xie et al., "Legal Issue Keyword Generation Method and System Thereof", published on Mar. 29, 2019, document ID CN109543017A, pp. 9 (Year: 2019).*

*Primary Examiner* — Chau T Nguyen
(74) *Attorney, Agent, or Firm* — Barta, Jones & Foley PLLC

(57) ABSTRACT

Embodiments provide methods and systems for generating domain-specific text summary. Method performed by processor includes receiving request to generate text summary of textual content from user device of user and applying pre-trained language generation model over textual content for encoding textual content into word embedding vectors. Method includes predicting current word of the text summary, by iteratively performing: generating first probability distribution of first set of words using first decoder based on word embedding vectors, generating second probability distribution of second set of words using second decoder based on word embedding vectors, and ensembling first and second probability distributions using configurable weight parameter for determining current word. First probability distribution indicates selection probability of each word (Continued)

being selected as current word. Method includes providing custom reward score as feedback to second decoder based on custom reward model and modifying second probability distribution of words for text summary based on feedback.

20 Claims, 10 Drawing Sheets

(51) Int. Cl.

| | | |
|---|---|---|
| *G10L 25/48* | (2013.01) | |
| *H04L 12/28* | (2006.01) | |
| *G10L 15/22* | (2006.01) | |
| *G10L 15/26* | (2006.01) | |
| *G10L 17/20* | (2013.01) | |
| *G06F 40/56* | (2020.01) | |

(52) U.S. Cl.
CPC .............. *G10L 15/26* (2013.01); *G10L 17/20* (2013.01); *G10L 25/48* (2013.01); *H04L 12/282* (2013.01); *G10L 2015/228* (2013.01)

(56) References Cited

U.S. PATENT DOCUMENTS

| | | | |
|---|---|---|---|
| 2019/0155877 A1* | 5/2019 | Sharma | G06F 40/151 |
| 2019/0325066 A1* | 10/2019 | Krishna | G06N 3/0472 |
| 2019/0347328 A1* | 11/2019 | Rush | G06F 40/30 |
| 2019/0370338 A1* | 12/2019 | Kong | G06F 40/30 |
| 2020/0134023 A1* | 4/2020 | Makino | G06F 40/56 |
| 2020/0242197 A1* | 7/2020 | Srinivasan | G06N 3/08 |
| 2020/0265192 A1* | 8/2020 | Lin | G06F 40/30 |
| 2020/0311195 A1* | 10/2020 | Mishra | G06F 40/253 |
| 2020/0327151 A1* | 10/2020 | Coquard | G06F 40/56 |
| 2020/0394260 A1* | 12/2020 | Wu | G06F 40/30 |
| 2021/0064956 A1* | 3/2021 | Zhiltsov | G06F 40/30 |

* cited by examiner

| TEXT ARTICLE | DOMAIN-SPECIFIC TEXT SUMMARY |
|---|---|
| 602 — TRAVEL BACK TO 18TH CENTURY ON AN AMERICAN REVOLUTION-BASED TOUR OF BOSTON WITH AN EXPERT ON THE SUBJECT. YOU AND YOUR FRIENDS WILL JOIN BROOKE BARBIER- AUTHOR OF BOSTON IN THE AMERICA REVOLUTION: A TOWN VERSUS AN EMPIRE - FOR THIS FASCINATING WALK ALONG THE FREEDOM TRAIL. YOU'LL VISIT THE SITE OF THE BOSTON MASSACRE, THE ORIGINAL BOSTON SHORELINE, THE TAVERN WHERE THE SONS OF LIBERTY PLANNED THE BOSTON TEA PARTY, AND MORE. PLUS, YOU'LL GO HOME WITH A SIGNED COPY OF YOUR GUIDE'S BOOK. EXCLUSIVELY FOR MASTER CARDHOLDERS. WHAT'S PRICELESS TALKING ABOUT REVOLUTIONARY BOSTON WITH AN EXPERT AND FELLOW HISTORY BUFFS IN AN ICONIC TAVERN. THE HIGHLIGHTS EXPLORE THE BEST OF BOSTON ON AN AMERICAN REVOLUTION TOUR LEARN FROM HISTORY EXPERT BROOKE BARBIER VISIT A HISTORIC TAVERN ON THE FREEDOM TRAIL RECEIVE A SIGNED COPY OF BROOKR BARBIER'S BOOK | LEARN FROM HISTORY EXPERT BROOKE BARBIER, AUTHOR OF BOSTON IN THE AMERICAN REVOLUTION: A TOWN VS AN EMPIRE. YOU'LL VISIT THE SITE OF THE BOSTON MASSACRE, THE ORIGINAL BOSTON SHORELINE, AND MORE. VISIT A HISTORIC PUB ON THE FREEDOM TRAIL. RECEIVE A SIGNED COPY OF YOUR GUIDE'S BOOK |
| 604 — EMBARK ON A GASTRONOMICAL ADVENTURE WITH A FOOD TOUR OF SOMERVILLE'S DAVIS SQUARE. AN EXPERT GUIDE WILL TAKE YOU AND A GUEST TO ALL OF THE HOT SPOTS IN THIS DIVERSE NEIGHBORHOOD, WHERE YOU'LL LEARN THE HISTORY OF THEIR DISHES AS YOU SAMPLE THEM FOR YOURSELF. ARRIVE HUNGRY, AS THE TOUR INCLUDES PLENTY OF INNOVATIVE EATS AND FLAVOR-FILLED SPECIALITIES, SUCH AS GYROS AND CREPES. YOU'LL VISIT THE AREA'S FIRST OATMEAL CAFÉ, SAMPLE ARTISANAL DONUTS AND CHOCOLATES, AND SO MUCH MORE. YOU'LL ALSO TRY YOUR HAND AT NEW ENGLAND'S CANDLEPIN BOWLING WHILE SNACKING ON THE LOCALS FAVORITE FLATBREAD PIZZA. EXCLUSIVELY FOR MASTERCARD CARDHOLDERS. WHATS PRICELESS DISCOVERING HIDDEN GEMS IN DAVIS SQUARE WITH SOMEONE SPECIAL. THE HIGHLIGHTS GO ON A FOODIE TOUR OF DAVIS SQUARE IN SOMERVILLE FOLLOW AND LEARN FROM YOUR EXPERT GUIDE HEAD TO THE LANES FOR CANDLEPIN BOWLING FINISH ON A SWEET NOTE WITH A SPECIAL TREAT | GO ON FOODIE TOUR OF DAVIS SQUARE IN SOMERVILLE, WHERE YOU'LL LEARN THE HISTORY OF THEIR DISHES AS YOU SAMPLE THEM FOR YOURSELF. HEAD TO LANES FOR CANDLEPIN BOWLING WHILE SNACKING ON THE LOCALS FAVORITE FLATBREAD PIZZA. FINISH ON A SWEET NOTE WITH A SPECIAL TREAT |

FIG. 6

METHODS AND SYSTEMS FOR GENERATING DOMAIN-SPECIFIC TEXT SUMMARIZATIONS

TECHNICAL FIELD

The present disclosure relates to text summarization techniques and, more particularly to, methods and systems for generating the text summaries according to a specific domain (i.e., tone) by the fine-tuning output of a decoder layer using reinforcement learning algorithms.

BACKGROUND

Automatic text summarization is a field of natural language generation task that is increasingly used in industry today. The goal of the text summarization process is to create a summary of a textual content that will retain the sense and the most important aspects while reducing the length substantially to a size that may be user-defined.

Conventional extractive text summarization techniques extract out key phrases from input textual content, and then select a subset of these phrases to place in the text summary. Text summaries generated by these conventional summarization techniques, however, are often not human like. Additionally, abstractive models generate a summary based on actual "abstracted" content. An abstraction-based summary can compress, fuse or paraphrase sections of the source document, using words that were not in the original input, generating new phrases and possibly rephrasing them. This gives a lot more potential to produce fluent and coherent summaries but it is also a much harder problem, as the model must be able to generate coherent phrases and connectors.

However, such conventional text summarization techniques generate a very standard summary and are not able to offer flexibility for changing the text summary output according to demographic preferences or application domains (such as, advertisement, stories, marketing, etc.). This may occur due to non-availability of sufficient datasets with natural language models that may be useful for generating customized text summary depending on the demographic preferences or the application domains.

Even if dataset for each demographic preference is available, there is a need for deploying different machine learning models for each demographic preference that is highly inefficient and cumbersome for natural language generation task. Particularly, these different machine learning models require to be trained on a larger dataset for generating accurate demographic or application domains based text summaries, thereby increasing resource utilization.

Thus, there is a need for a technical solution for generating domain-specific text summaries via electronic means to an unprecedented manner/degree, through use of artificial intelligence and machine learning.

SUMMARY

Various embodiments of the present disclosure provide systems, methods, electronic devices and computer program products for generating domain-specific text summary.

In an embodiment, a computer-implemented method is disclosed. The computer-implemented method performed by a processor includes receiving a request to generate text summary of a textual content from a user device of a user. The computer-implemented method includes applying a pre-trained language generation model over the textual content for encoding the textual content into word embedding vectors. The computer-implemented method includes predicting a current word associated with the text summary, by iteratively performing: generating a first probability distribution of a first set of words using a first decoder based in part on the word embedding vectors, generating a second probability distribution of a second set of words using a second decoder based in part on the word embedding vectors, and ensembling the first and second probability distributions of words using a configurable weight parameter for determining the current word for the text summary. The first probability distribution indicates a selection probability value of each word of the first set of words being selected as the current word for the text summary. The computer-implemented method includes providing a custom reward score as a feedback to the second decoder based, at least in part, on a custom reward model and modifying the second probability distribution of words for the text summary based, at least in part, on the feedback of the custom reward score.

In another embodiment, a text summarization system is disclosed. The text summarization system includes a communication interface, a memory including executable instructions, and a processor communicably coupled to the communication interface. The processor is configured to execute the executable instructions to cause the text summarization system to at least receive a request to generate text summary of a textual content from a user device of a user and apply a pre-trained language generation model over the textual content for encoding the textual content into word embedding vectors. The text summarization system is further caused to predict a current word associated with the text summary, by iteratively performing: generating a first probability distribution of a first set of words using a first decoder based in part on the word embedding vectors, generating a second probability distribution of a second set of words using a second decoder based in part on the word embedding vectors, and ensembling the first and second probability distributions of words using a configurable weight parameter for determining the current word for the text summary. The first probability distribution indicates a selection probability value of each word of the first set of words being selected as the current word for the text summary. The text summarization system is further caused to provide a custom reward score as a feedback to the second decoder based, at least in part, on a custom reward model and modify the second probability distribution of words for the text summary based, at least in part, on the feedback of the custom reward score.

In yet another embodiment, a yet another text summarization system for generating domain-specific text summary is disclosed. The text summarization system includes an encoder, a decoder including a base decoder and a fine-tuned decoder, ensemble manager, and a custom reward calculator. The encoder is configured to encode a textual content, to be summarized, into word embedding vectors using a pre-trained language generation model. The decoder is configured to predict a current word associated with a text summary. For each iteration of predicting the current word, the base decoder is configured to generate a first probability distribution of a first set of words based, at least in part, on the word embedding vectors, the fine-tuned decoder is configured to generate a second probability distribution of a second set of words using the fine-tuned decoder based, at least in part, on the word embedding vectors, and the ensemble manager is configured to ensemble the first and second probability distributions of words based, at least in part, on a configurable weight parameter for determining the current word for the text summary. The first probability distribution indicates a selection probability value of each word of the first set of words being selected as the current word for the text summary. The custom reward calculator is configured to provide a custom reward score as a feedback to the fine-tuned decoder based, at least in part, on a custom reward model.

BRIEF DESCRIPTION OF THE FIGURES

For a more complete understanding of example embodiments of the present technology, reference is now made to the following descriptions taken in connection with the accompanying drawings in which:

FIG. 6 shows a table depicting examples of domain-specific text summaries generated by the text summarization system for text articles, in accordance with an example embodiment;

Figure 1:
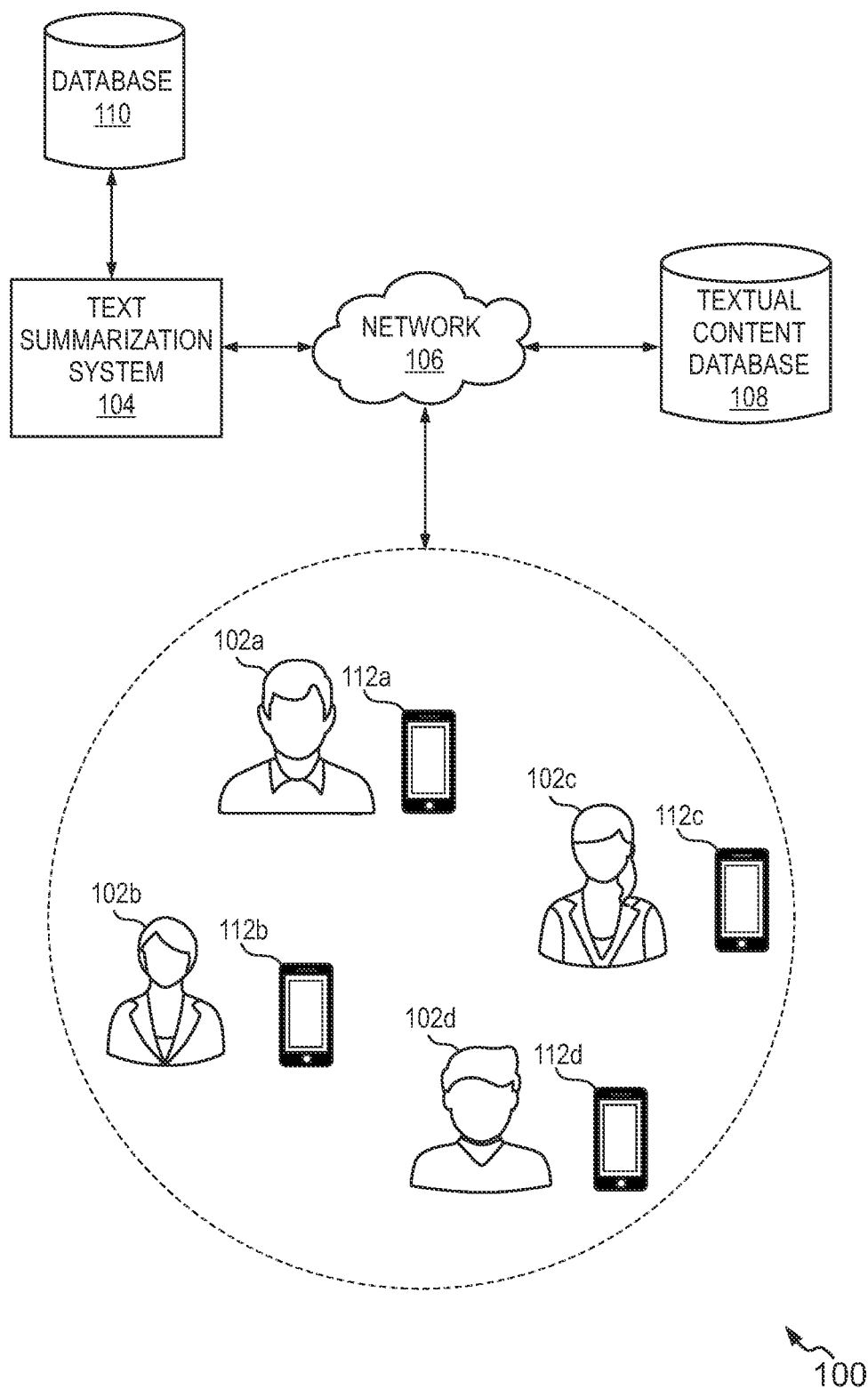
FIG. 1 is an example representation of an environment, related to at least some example embodiments of the present disclosure.

The drawings referred to in this description are not to be understood as being drawn to scale except if specifically noted, and such drawings are only exemplary in nature.

DETAILED DESCRIPTION

In the following description, for purposes of explanation, numerous specific details are set forth in order to provide a thorough understanding of the present disclosure. It will be apparent, however, to one skilled in the art that the present disclosure can be practiced without these specific details.

Reference in this specification to "one embodiment" or "an embodiment" means that a particular feature, structure, or characteristic described in connection with the embodiment is included in at least one embodiment of the present disclosure. The appearance of the phrase "in an embodiment" in various places in the specification is not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not for other embodiments.

Moreover, although the following description contains many specifics for the purposes of illustration, anyone skilled in the art will appreciate that many variations and/or alterations to said details are within the scope of the present disclosure. Similarly, although many of the features of the present disclosure are described in terms of each other, or in conjunction with each other, one skilled in the art will appreciate that many of these features can be provided independently of other features. Accordingly, this description of the present disclosure is set forth without any loss of generality to, and without imposing limitations upon, the present disclosure.

Overview

Various example embodiments of the present disclosure provide methods, systems, user devices and computer program products for generating domain-specific text summary.

In various example embodiments, the present disclosure describes a text summarization system that facilitates generation of the domain-specific text summary. In one embodiment, the domain-specific text summary, as described herein, may be based on a type of words (e.g., simple, complex), specific application domains (such as, marketing, political news, games, story-telling, entertainment, etc.) or demographic of people (e.g., college educated, living in the US, age, sex, and so forth). In one example, the domain-specific text summary maybe, but not limited to, short notes of email conversations, short summaries of financial news, micro-blogs, etc. The text summarization system includes at least a processor and a memory. The processor is configured to receive a request to generate text summary of a textual content from a user device of a user. The textual content may be any text articles such as, PDF document, email messages, etc. The processor is configured to apply a pre-trained language generation model over the textual content for encoding the textual content into word embedding vectors. In one embodiment, the pre-trained language generation model is bidirectional encoder representation from transformers (Bert) language generation model.

The processor is configured to predict sentences associated with the text summary, in sequential manner. In particular, the processor is configured to predict each word of each sentence of the text summary, one by one, iteratively. For predicting a current word of a sentence of the text summary, the processor is configured to generate a first probability distribution of a first set of words using a first decoder based in part on the word embedding vectors. The first probability distribution indicates a selection probability value of each word of the first set of words being selected as the current word for the text summary. The processor is configured to generate a second probability distribution of a second set of words using a second decoder based in part on the word embedding vectors. Thereafter, the processor is configured to ensemble the first and second probability distributions of words using a configurable weight parameter for determining the current word for the text summary. The word having a peak combined probability value is selected as the current word of the text summary.

In one embodiment, the configurable weight parameter is adapted based at least in part on domain-specific requirements (for example, marketing style content) in the text summary. The configurable weight parameter is trained using reinforcement machine learning algorithms.

In one embodiment, the processor is configured to calculate a custom reward score and provide a custom reward score as a feedback to the second decoder based, at least in part, on a custom reward model. The custom reward score is summary-level rewards. In one embodiment, the custom reward model is a reinforcement machine learning based model and trained based at least on domain-specific datasets (such as, for example, reference domain-specific text summaries).

In one embodiment, the processor is configured to modify the second probability distribution of words for the text summary based, at least in part, on the feedback of the custom reward score and update the text summary based on the modified second probability distribution of the words to incorporate domain-specific requirements. In other words, the processor is configured to update words in the text summary such that the custom reward score generated after the updated text summary is maximized.

Various embodiments of the present disclosure offer multiple advantages and technical effects. For instance, the present disclosure provides a text summarization system for generating domain-specific text summaries from textual contents. The text summarization system utilizes an additional decoder layer (i.e., "fine-tuned decoder") with a pre-trained base decoder for generating the text summaries. The additional decoder layer enables the text summarization system to reframe the text summaries according to domain-specific datasets, without destroying original probability distribution of the base decoder. Additionally, the reinforcement learning allows the fine-tuned decoder to train machine leaning models with very small sets of reference datasets.

Various example embodiments of the present disclosure are described hereinafter with reference to FIGS. 1 to 9.

FIG. 1 illustrates an exemplary representation of an environment 100 related to at least some example embodiments of the present disclosure. Although the environment 100 is presented in one arrangement, other embodiments may include the parts of the environment 100 (or other parts) arranged otherwise depending on, for example, predicting server failures, etc. The environment 100 generally includes a plurality of users 102*a*, 102*b*, 102*c* and 102*d*, a text summarization system 104, and a textual content database 108, each coupled to, and in communication with (and/or with access to) a network 106. The network 106 may include, without limitation, a light fidelity (Li-Fi) network, a local area network (LAN), a wide area network (WAN), a metropolitan area network (MAN), a satellite network, the Internet, a fiber optic network, a coaxial cable network, an infrared (IR) network, a radio frequency (RF) network, a virtual network, and/or another suitable public and/or private network capable of supporting communication among two or more of the parts or users illustrated in FIG. 1, or any combination thereof. Various entities in the environment 100 may connect to the network 106 in accordance with various wired and wireless communication protocols, such as Transmission Control Protocol and Internet Protocol (TCP/IP), User Datagram Protocol (UDP), 2nd Generation (2G), 3rd Generation (3G), 4th Generation (4G), 5th Generation (5G) communication protocols, Long Term Evolution (LTE) communication protocols, or any combination thereof.

For example, the network 106 may include multiple different networks, such as a private network made accessible by a plurality of user devices 112*a*, 112*b*, 112*c* and 112*d* associated with respective users 102*a*, 102*b*, 102*c*, 102*d*, separately, and a public network (e.g., the Internet etc.) through which the plurality of users 102*a*, 102*b*, 102*c*, 102*d* and the text summarization system 104 may communicate. In one embodiment, the plurality of users 102*a*, 102*b*, 102*c* and 102*d* are related to different demographic regions or with different specific domain requirements. The plurality of users 102*a*, 102*b*, 102*c* and 102*d* hereinafter is collectively represented as "the user 102".

The user 102 uses an application (i.e., "text summarization application") on his/her user device 112 to send a request to the text summarization system 104 for summarizing a textual content (such as, for example, technological based article) according to a specific application domain or user-preferences. The user device 112 and the mobile device are used interchangeably throughout the present description. The user device 112 may be any electronic device such as, but not limited to, a personal computer (PC), a tablet device, a Personal Digital Assistant (PDA), a voice activated assistant, a Virtual Reality (VR) device, a smartphone and a laptop.

As described herein, the textual content may include, but not limited to, any type of textual content, such as printed articles (e.g., "financial and marketing articles"), word processing documents, text on a web page, PDFs, and so forth. In one embodiment, the textual content may also be obtained using speech to text translation methods.

For instance, the user 102 may want a text summary of an article, published in a magazine or a particular website, in marketing article tone. The user 102 sends a request to the text summarization system 104 with the article that needs to be summarized. The text summarization system 104 generates a marketing domain-based text summary according to the request by the user 102.

In one embodiment, the domain-specific text summary, as described herein, may be based on a type of words (e.g., simple, complex), specific application domains (such as marketing, political news, games, story-telling, entertainment, etc.) or a demographic of people (e.g., college-educated, living in the UK, age, sex, and so forth).

In one embodiment, the user device may create and store a user profile including both personal and contextual information associated with the user 102. The text summarization system 104 may receive the user profile details associated with the user 102 as well during the request for text summarization, thereby enabling the text summarization system 104 to create more personalized and context-aware text summaries.

In one embodiment, the text summarization system 104 may access the textual content from the textual content database 108.

The text summarization system 104 includes a processor and a memory. The text summarization system 104 is configured to perform one or more of the operations described herein. In one embodiment, the text summarization system 104 is configured to communicate with a database 110 storing domain-specific reinforcement machine learning models. In general, the text summarization system 104 is configured to generate the domain-specific text summary.

The text summarization system 104 is in communication with, via the network 106, the plurality of users 102*a*, 102*b*, 102*c* and 102*d*, and the textual content database 108. In other embodiments, the text summarization system 104 may actually be incorporated, in whole or in part, into one or more parts of the environment 100. In addition, the text summarization system 104 should be understood to be embodied in at least one computing device in communication with the network 106, which may be specifically configured, via executable instructions, to perform as described herein, and/or embodied in at least one non-transitory computer readable media.

Specifically, in one embodiment, the text summarization system 104 utilizes a fine-tuned decoder layer for updating the text summary as per domain-specific requirements. The fine-tuned decoder layer is trained with reinforcement learning, utilizing whole-summary-level supervision to make summaries more coherent and readable.

The number and arrangement of systems, devices, and/or networks shown in FIG. 1 are provided as an example. There may be additional systems, devices, and/or networks; fewer systems, devices, and/or networks; different systems, devices, and/or networks; and/or differently arranged systems, devices, and/or networks than those shown in FIG. 1. Furthermore, two or more systems or devices shown in FIG. 1 may be implemented within a single system or device, or a single system or device shown in FIG. 1 may be implemented as multiple, distributed systems or devices. Additionally, or alternatively, a set of systems (e.g., one or more systems) or a set of devices (e.g., one or more devices) of the environment 100 may perform one or more functions described as being performed by another set of systems or another set of devices of the environment 100.

Figure 2:
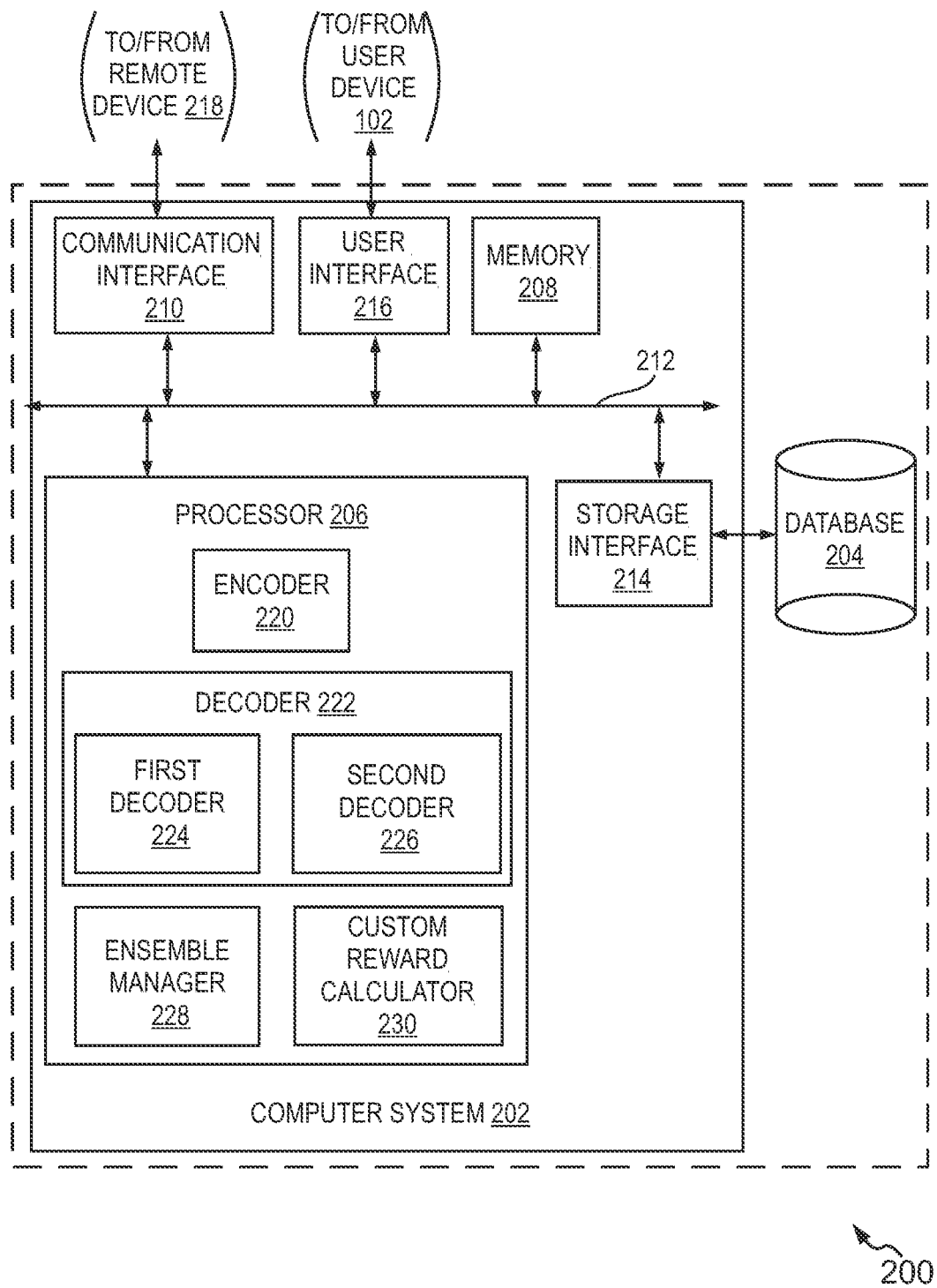
FIG. 2 is a simplified block diagram of a text summarization system, in accordance with one embodiment of the present disclosure.

Referring now to FIG. 2, a simplified block diagram of a text summarization system 200, is shown, in accordance with an embodiment of the present disclosure. The text summarization system 200 is similar to the text summarization system 104. In some embodiments, the text summarization system 200 is embodied as a cloud-based and/or SaaS-based (software as a service) architecture. In some embodiments, the text summarization system 200 may be implemented in a server system.

The text summarization system 200 includes a computer system 202 and a database 204. The computer system 202 includes at least one processor 206 for executing instructions, a memory 208, a communication interface 210, and a user interface 216 that communicate with each other via a bus 212.

In some embodiments, the database 204 is integrated within computer system 202. For example, the computer system 202 may include one or more hard disk drives as the database 204. A storage interface 214 is any component capable of providing the processor 206 with access to the database 204. The storage interface 214 may include, for example, an Advanced Technology Attachment (ATA) adapter, a Serial ATA (SATA) adapter, a Small Computer System Interface (SCSI) adapter, a RAID controller, a SAN adapter, a network adapter, and/or any component providing the processor 206 with access to the database 204.

In one embodiment, the database 204 is configured to store one or more neural network data models such as, custom reward models, pre-trained language generation models, and reference abstractive text summaries associated with each specific application domains.

The processor 206 includes suitable logic, circuitry, and/or interfaces to execute operations for receiving a request from the user 102 for generating a domain-specific text summary. The processor 206 also receives a textual content that needs to be summarized.

Examples of the processor 206 include, but are not limited to, an application-specific integrated circuit (ASIC) processor, a reduced instruction set computing (RISC) processor, a complex instruction set computing (CISC) processor, a field-programmable gate array (FPGA), and the like. The memory 208 includes suitable logic, circuitry, and/or interfaces to store a set of computer readable instructions for performing operations. Examples of the memory 208 include a random-access memory (RAM), a read-only memory (ROM), a removable storage drive, a hard disk drive (HDD), and the like. It will be apparent to a person skilled in the art that the scope of the disclosure is not limited to realizing the memory 208 in the text summarization system 200, as described herein. In another embodiment, the memory 208 may be realized in the form of a database server or a cloud storage working in conjunction with the text summarization system 200, without departing from the scope of the present disclosure.

The processor 206 is operatively coupled to the communication interface 210 such that the processor 206 is capable of communicating with a remote device 218 such as devices including textual content analyzer applications, or communicate with any entity connected to the network 106 (as shown in FIG. 1). Further, the processor 206 is operatively coupled to the user interface 216 for interacting with the user 102.

It is noted that the text summarization system 200 as illustrated and hereinafter described is merely illustrative of an apparatus that could benefit from embodiments of the present disclosure and, therefore, should not be taken to limit the scope of the present disclosure. It is noted that the text summarization system 200 may include fewer or more components than those depicted in FIG. 2.

In one embodiment, the processor 206 includes an encoder 220, a decoder 222 (including a first decoder 224 and a second decoder 226), an ensemble manager 228, and a custom reward calculator 230. It should be noted that components, described herein, such as the encoder 220, the decoder 222, the ensemble manager 228, and the custom reward calculator 230 can be configured in a variety of ways, including electronic circuitries, digital arithmetic and logic blocks, and memory systems in combination with software, firmware, and embedded technologies.

The encoder 220 includes suitable logic and/or interfaces for applying a pre-trained language generation model over the textual content for encoding the textual content into word embedding vectors. The pre-trained language generation model may correspond to any type of language generation model or algorithm that can generate summaries of textual content. The encoder 220 encodes or embeds words of the textual content, for example, by mapping each word in the textual content to a vector space or matrix. In other words, the encoder 220 encodes an input sequence of the textual content, for example, by taking each word of sentences written in the textual content (e.g., "text document") and outputting a respective vector. In some cases, the pre-trained language generation model is trained using machine learning (e.g., a neural network) to convert the textual content into a vector space.

For example, the language generation model may be implemented as an extractive summarization algorithm, an abstractive summarization algorithm, a sequence to sequence neural encoder, and so forth.

In some embodiments, the encoder 220 may include a natural-language processing model, a binary classification model, a convolutional neural network model, a deep learning model, Embeddings from Language Models (ELMo) representation model, or any other model configured to generate word embedding vectors of the textual content. In some embodiments, the encoder 220 may initialize word embeddings using pre-trained language generation models such as GloVe and word2vec to obtain a fixed word embedding of each word in the textual content.

In one embodiment, to accomplish the encoding or embedding, the encoder 220 is implemented with or incorporates Bert (Bidirectional encoder representation from transformers) language generation model. The encoder 220 employing the Bert model is explained with reference to FIG. 4. Thereafter, the processor 206 is configured to perform decoding process of the word embedding vectors in a sequential manner and predict words of the text summary one by one. The decoding process is performed by the decoder 222.

The decoder 222 includes suitable logic and/or interfaces for decoding the word embedding vectors for predicting sentences associated with the text summary, iteratively. More particularly, the decoder 222 continues to predict words of a sentence of the text summary until an end token of the sentence is received. After predicting the sentence, the decoder 222 follows similar operations for predicting the next sentences. The decoder 222 follows a sequential model that predicts the next word of the sentence at a time step. The decoder includes a first decoder 224 and a second decoder 226. In one example, the first and second decoders are attention-based transformer decoders.

The first decoder 224 is trained using generic large datasets. In contrast, the second decoder 226 is trained based on a limited sample dataset. The limited sample dataset may be based on user preferences and application domains. During the training process, the first decoder 224 and the second decoder 226 take a vector representation of each sentence of the textual content as input and learn a representation learning of the vector representation and try to transform to a true label translation ("ground-truth summary"). The first and second decoders follow an inverse process of the word embedding process. In one embodiment, the second decoder 226 is trained on text articles and their associated domain-specific text summaries. In one example, the second decoder 226 is trained based on a plurality of datasets related to marketing news.

In one embodiment, the first decoder 224 generates a first probability distribution over the first set of words (i.e., a subset of fixed vocabulary) predicted from the textual content based in part on the word embedding vectors. The first probability distribution indicates a selection probability value (i.e., "word preference probability") of each word from the first set of words. The selection probability value represents a probability of each word from the first set of words being selected as the current word for a targeted text summary. The first decoder 224 determines the selection probability value based on the words in the inputted textual content as well the words of the targeted summary which have already been generated by the processor 206.

Similarly, the second decoder 226 generates a second probability distribution (i.e., "word preference probability") of the second set of words based on the word embedding vectors received from the encoder 220. The second probability distribution indicates a selection probability value (i.e., "word preference probability") of each word from the second set of words. In one embodiment, the first set of words and the second set of words are similar and contain the same set of words of the fixed vocabulary. In another embodiment, the first set of words and the second set of words have a different set of words of the fixed vocabulary.

The ensemble manager 228 includes suitable logic and/or interfaces for combining/ensembling the first and second probability distributions of words of the fixed vocabulary using a weighting function for determining the current word of the text summary. The determined current word has the highest combined probability value of word preference among other probable vocabulary words. In one embodiment, the weighting function implements a weighted average approach using a configurable weight parameter (2) for combining the first and second probability distributions of the words. In general, the weighted average approach allows multiple models to contribute to a prediction in proportion to their trust or estimated performance.

The configurable weight parameter (2) can be varied in a manner such that the text summary can be fine-tuned according to the requirements of domain applications. In one embodiment, the configurable weight parameter (2) has a value between '0' and '1'. The ensemble manager 228 is configured to train the configurable weight parameter (2) utilizing the reinforcement machine learning algorithm using reference summaries. In one embodiment, the configurable weight parameter is utilized for updating the text summary according to domain-specific styles.

In one embodiment, during validation, the ensemble manager 228 adjusts the configurable weight parameter (2) associated with the prediction outputs of the first decoder 224 and the second decoder 226 according to the test dataset.

For example, an abstractive text summary may include n sentences (e.g., $S=\{S_1, S_2 \ldots S_n\}$), where first sentence $S_1$ includes m words (i.e., $W_1, W_2, \ldots W_m$). First, the processor 206 is configured to predict the word "$W_1$" of the first sentence and then $W_2, W_3 \ldots W_m$.

The custom reward calculator 230 includes suitable logic and/or interfaces for calculating custom reward scores based on a custom reward model and providing the custom reward scores as feedback to the second decoder 226.

During the training process, after predicting the text summary, the custom reward calculator 230 is configured to calculate the custom reward score. In one embodiment, the custom reward score is sentence-level rewards. Based on the feedback, the second decoder 226 is configured to modify the second probability distribution for the selection of words for the text summary depending upon custom domain-specific requirements. In other words, based on the feedback, the second decoder 226 is configured to optimize text summary generations to incorporate the custom domain-specific requirements. In one embodiment, the processor 206 is configured to generate words of a text summary such that the custom reward score generated after the text summary generation is maximized.

In one embodiment, the custom reward model is trained on the fly based on the user feedback and/or the custom domain-specific requirements. In one embodiment, during the training process, the custom reward calculator 230 evaluates decoder text summary output against domain-specific language requirements and calculates a custom reward score or penalty for reframing the decoder summary output. The custom reward calculator 230 stores the calculated reward scores associated with each domain applications and applies the reward scores as a feedback to the second decoder 226 for maximizing the custom reward score, thereby generating more reliable and domain-specific text summaries.

To optimize discrete evaluation metrics like ROUGE, the text summarization system uses reinforcement learning algorithms. In some embodiments, reinforcement learning is implemented using a cross-entropy loss algorithm.

For instance, suppose, the user 102 may want a text summary of an article in the "story-telling" tone and sends a request to the text summarization system 104, accordingly. For sending the request, the user 102 uploads the article on a text summarization application. Then, the text summarization system 104 accesses the article and encodes the article content using the pre-trained language generation model for generating word embedding vectors corresponding to words contained in the article. The word embedding vectors are decoded by the first and second decoders. The first decoder 224 generates a probability distribution for a set of words that may be selected for the first word of a first sentence associated with the text summary. Similarly, the second decoder 226 also generates a probability distribution for the set of words that may be selected for the first word of the text summary. Both the probability distributions are combined using a reinforcement based parameter for finding a word with the highest combined probability value. The word with the highest combined probability value is selected as the first word for the sentence. Similarly, the next words of the first sentence are selected until the first sentence does not end. In the end, the text summarization system also applies the custom reward model over the generated text summary output. During the training process, the custom reward model is trained using small sets of story-telling reference summaries.

The custom reward model evaluates the generated sentence summary using ROUGE metrics and calculates the custom reward score which is fed back to the second decoder 226. Based on the feedback, the second decoder 226 modifies the second probability distribution of the set of words so that the text summary can be reframed or modified according to the domain-specific requirement.

Figure 3:
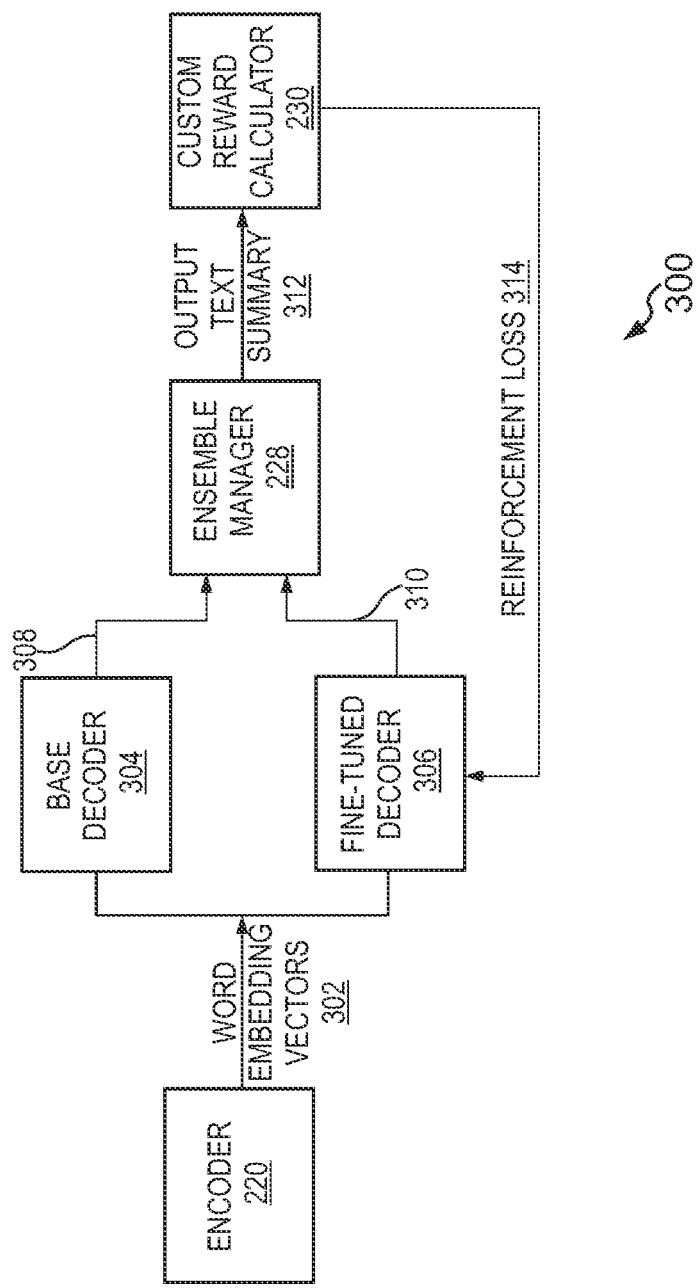
FIG. 3 is a schematic block diagram representation of a process flow for generating domain-specific text summaries, in accordance with an example embodiment.

Referring now to FIG. 3, a schematic block diagram representation 300 of a process flow for generating domain-specific text summaries, is shown, in accordance with an embodiment of the present disclosure. At first, the processor 206 is configured to receive as input a source textual content (i.e., "a source document"). The source textual content includes a number (n) of sentences (e.g., "Travel back to the $18^{th}$ century on . . . " as shown in FIG. 6).

The processor 206 is also configured to receive datasets from the user device 112 information related to user-preferences and required application domains (e.g., "advertisement", "marketing", "news", "story-telling", etc.).

The encoder 220 encodes or embeds words of the source textual content for example, by mapping each word in the source textual content to a vector space or matrix. In some embodiments, to accomplish the encoding or embedding, the encoder 220 is implemented with or incorporates one or more pre-trained bidirectional recurrent neural network (RNN) models. In one embodiment, the encoder 220 implements Bert language generation model.

The encoder 220 applies the RNN model to parse a sequence of words of each sentence and converts each sentence to a sequence of vectors. The context of each word is also captured using an attention mechanism and then the encoder 220 generates a word embedding vector associated with each word with its context taking into consideration. Then, generated word embedding vectors 302 are passed to the decoder 222.

The decoder 222 is factorized into two parts such as a base decoder 304 (corresponding to the first decoder 224) and a fine-tuned decoder 306 (corresponding to the second decoder 226).

The base decoder 304 follows an inverse process of the encoding process. The base decoder 304 is a transformer decoder. The base decoder 304 includes a plurality of layers such as a multi-head attention layer followed by feed-forward neural network layer and a masked multi-head attention layer. The plurality of layers in the base decoder 304 is responsible to provide more focus on appropriate parts of the input sentence. The base decoder 304 is pre-trained on large scale text corpora. The base decoder 304 predicts one word at each time step taking into consideration input from the encoder and information already generated by the base decoder 304. In one embodiment, the base decoder 304 generates first probability distribution 308 of the first set of words which indicates a selection probability value of each word of the first set of words being selected as a next generated word for the text summary.

Similarly, the fine-tuned decoder 306 is a transformer decoder. The fine-tuned decoder 306 includes a plurality of layers such as, a multi-head attention layer followed by feed-forward neural network layer and a masked multi-head attention layer. The fine-tuned decoder 306 is pre-trained on small scale text summaries related to target demographic preferences and application domains. In one example, the fine-tuned decoder 306 may be trained using 50-100 marketing text summaries for generating a text summary with marketing article characteristics. The fine-tuned decoder 306 has a reinforcement based feedback layer in addition to the pre-trained language model, which modifies the probability distribution of words predicted during text summary generation, thereby reframing the text summaries. In other words, the reinforcement-based feedback layer is configured to tune the output of the fine-tune decoder 306 according to required user preferences and/or specific application domains. In one embodiment, the fine-tuned decoder 306 generates a second probability distribution 310 of words being selected for the text summary.

Thereafter, the ensemble manager 228 combines the first and second probability distribution of words for identifying a current word of the text summary. The current word is selected based on a combined probability value. The word associated with the highest combined probability value is selected as the current word. This process is iteratively performed until a sentence ends. In one embodiment, the ensemble manager 228 utilizes a configurable weight parameter ($\lambda$) for combining outputs of the base decoder 304 and the fine-tuned decoder 306. The configurable weight parameter ($\lambda$) is learned using reinforcement learning methods during the training process. The configurable weight parameter ($\lambda$) is used to find weightage between the outputs of the base decoder 304 and the fine-tuned decoder 306. In one embodiment, the ensemble manager 228 provides the whole text summary (i.e., "output text summary 312") to the custom reward calculator 230.

After generating the whole text summary, the custom reward calculator 230 calculates summary-level reward scores using a custom reward model to optimize text summary generations for incorporating custom domain-specific requirements. In one embodiment, the custom reward model utilizes reinforcement machine learning models for fine-tuning the domain-specific text summary. In other words, during the training process, the custom reward model is configured to compare the generated summary with a ground-truth reference summary and generate the custom reward score 314 (i.e., "reinforcement loss") which is fed back to the fine-tuned decoder 306 to modify probability distribution of words predicted for generating the required text summary. The custom reward calculator 230 implements cross-entropy loss methods during the training process. Let $w^s$ denotes a text summary obtained by sampling, $w^a$ greedy text summary obtained by greedily choosing words by the decoder 222, and r(y) a custom score of a summary y, and $\theta$ model parameters associated with the fine-tuned decoder 306. Recall oriented understudy for gisting evaluation (ROUGE) is used for comparing sub-phrases in the generated summaries against sub-phrases in the ground-truth reference summaries. The ground-truth is part of a manually annotated data set that is used as a reference/comparison. The reinforcement loss $L_{RL}$ (i.e., "custom reward score") is:

$$\nabla_\theta L_{RL} = -(r(w^s) - r(w^a))\nabla_\theta \log p_\theta(w^s) \quad \text{Eqn. (1)}$$

In one example, the r(.) function is ROUGE (Recall Oriented Understudy for Gisting Evaluation) function indicating a comparison between generated text summaries and reference text summaries. In other words, the ROUGE is used as a reward in the custom reward calculator 230 at each time step for a single sentence. ROUGE is a set of metrics and a software package used for evaluating automatic summarization and machine translation software in natural language processing. The metrics compare an automatically produced summary or translation against a reference or a set of references (human-produced) summary or translation.

In one embodiment, the custom reward score is used to calculate gradient with respect to the model parameters, as follows:

$$\theta_t = \theta_{t-1} - \alpha \nabla_\theta \quad \text{Eqn. (2)}$$

In the Eqn. (2), $\alpha$ is a learning rate, $\nabla_\theta$ is model parameters gradient, and $\theta_t$ and $\theta_{t-1}$ represent model parameter values at "t" and "t−1" time steps, respectively. As a result, the custom reward score is used to update the model parameters. Based on the model parameters update, the fine-tuned decoder 306 updates the probability distributions of words for text summary generation in order to maximize the custom reward score. In one example, the r(.) function checks order of information in generated text summary with respect to original text article and repetition of phrases in the text summary.

Figure 4:
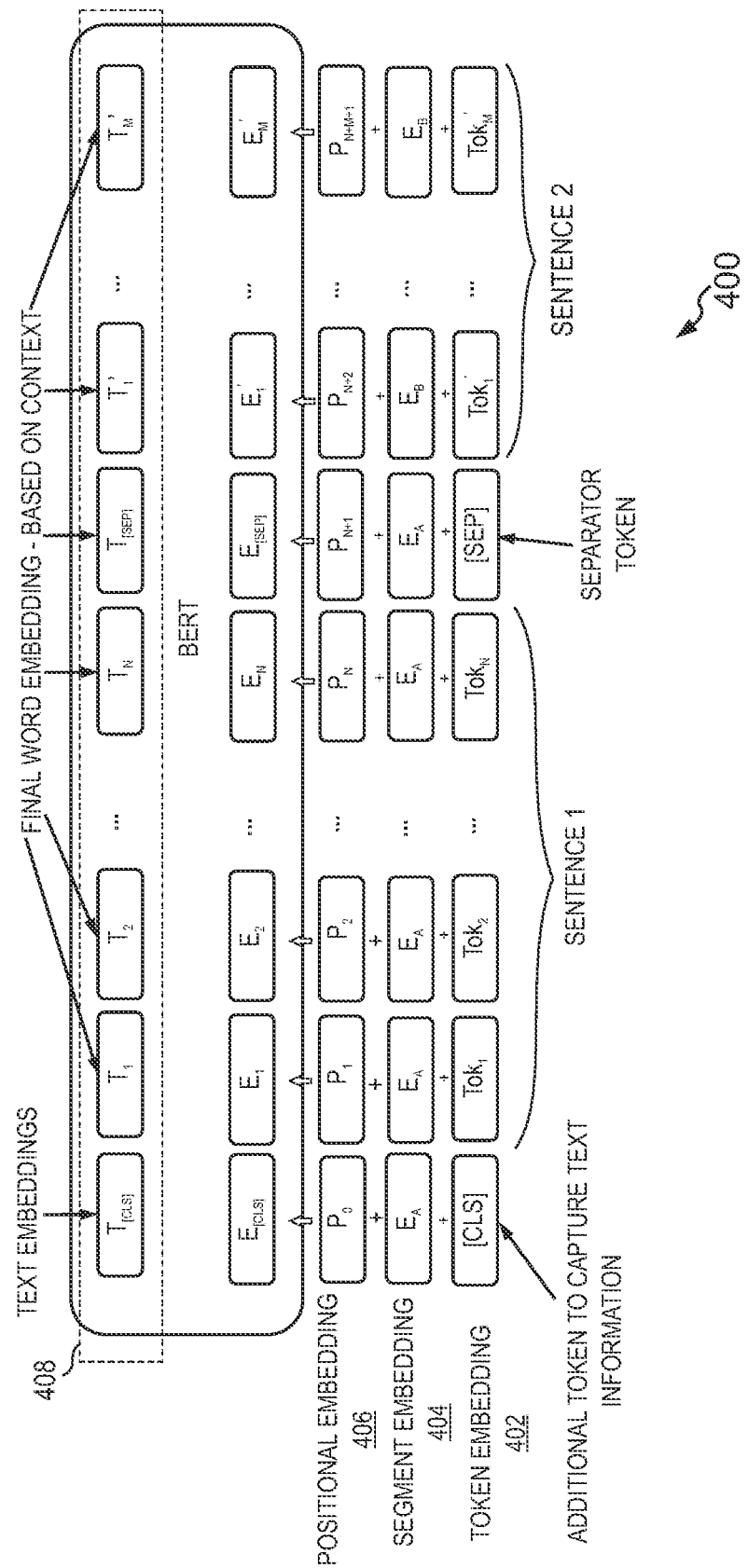
FIG. 4 is a simplified block diagram of a Bert (Bidirectional encoder representation from transformers) encoder included in the text summarization system, in accordance with an example embodiment.

Referring now to FIG. 4, a simplified block diagram of a Bert encoder 400, is shown, in accordance with an embodiment of the present disclosure. The encoder 220 is a type of the pre-trained Bert encoder 400.

The pre-trained Bert encoder 400 is configured to perform input embedding process over each pair of two sentences of the textual content, sequentially. The input embedding process composes of word piece embedding, token embedding (see, 402), segment embedding (see, 404), and positional embedding (see, 406) of the same dimension. Initially, a token embedding is performed over the two sentences and further "CLS" and "SEP" tokens are inserted at the beginning of each sentence token and end of each sentence (see 402). The "CLS" token indicates a symbol for each sentence representation. If the input has T tokens, including the added tokens, the output will have T outputs also. The segment embedding model is configured to sequence tokens according to the related sentence. The positional embedding (see 406) is used for adding positions of each token in the sequence.

In the end, outputs of all the embedding processes are used to form a single vector representation of the textual content. The Bert encoder 400 generates final word embedding (see, 408) along with contextual information (i.e., "attention information") of each word.

Figure 5A:
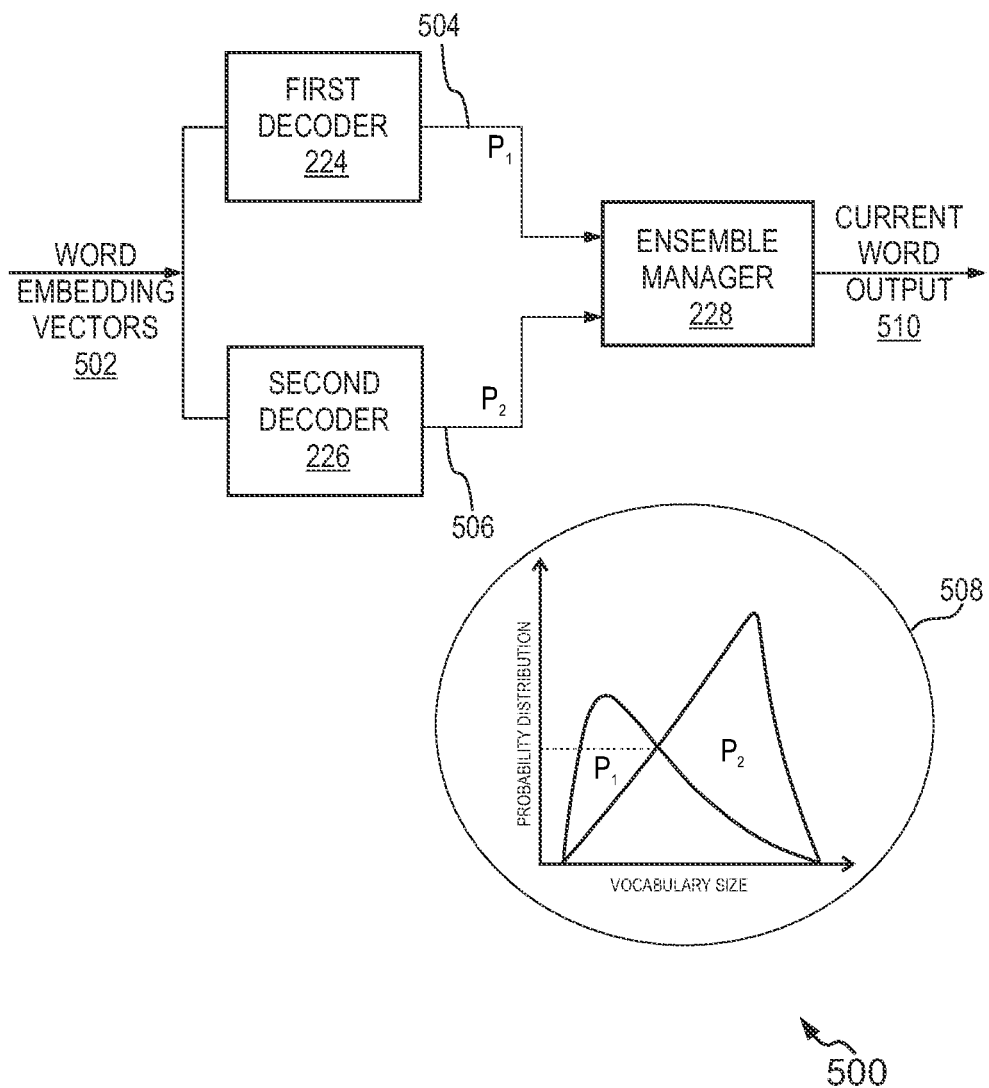
FIG. 5A is a schematic block diagram representation of a process flow of decoding process for generating the domain-specific text summary, in accordance with an example embodiment.

Referring now to FIG. 5A, in conjunction with the FIGS. 2 and 4, a schematic block diagram representation 500 of a process flow of decoding process for generating the domain-specific text summary, is shown, in accordance with an embodiment of the present disclosure. The decoder 222 receives word embedding vectors 502 associated with a textual content from the Bert encoder 400.

As mentioned previously, the decoder 222 includes the first decoder 224 and the second decoder 226. Each decoder is a transformer decoder and includes a plurality of layers such as, a multi-head attention layer followed by a feed-forward neural network layer and a masked multi-head attention layer. The plurality of layers in each decoder is responsible to provide more focus on appropriate parts of the input sentence.

In an embodiment, the first decoder 224 is pre-trained on other large scale text corpora. Further, the first decoder 224 generates a first probability distribution 504 (denoted as, "$P_1$") of selection of words from the fixed vocabulary for the text summary. The first probability distribution includes a probability value associated with each probable word indicating a number of occurrences of each probable word at first decoder output during the current word generation.

In an embodiment, the second decoder 226 is pre-trained on small scale text corpora related to target demographic preferences and application domains. In one example, the second decoder 226 may be trained using 50-100 marketing text summaries for generating text summary with marketing article characteristics. The second decoder 226 also generates a second probability distribution 506 (denoted as, "$P_2$") of selection of words for the text summary. Similarly, the second probability distribution includes a probability value associated with each probable word indicating a number of occurrences of each probable word at the second decoder output during the current word generation.

Thereafter, the ensemble manager 228 ensembles the first and second probability distributions of words for identifying a current word using a configurable weight parameter. The ensembling using the configurable weight parameter is defined as:

$$P_{current\_word} = \text{Max}((1-\lambda)P_1 + \lambda P_2) \quad \text{Eqn. (2)}$$

A word having a peak combined probability value is selected as the current word of the text summary. In one embodiment, the configurable weight parameter (2) is adapted based on the domain-specific requirements (i.e., target demographic tone) in the text summary. The configurable weight parameter (2) is a reinforcement based parameter and used for finding weightage between the outputs of the two decoders during the training process.

As shown in graph 508, the word corresponding to the $P_{current\_word}$ value is selected as the current word output 510 of the text summary. This process continues until the complete text summary is generated.

In one non-limiting example, at time t1, each decoder generates 13000-word dimensional vectors associated with words among which one word may be the current word of the text summary. The ensemble manager 228 combines both the 13000-word dimensional vectors into a combined 13000 word dimensional vectors. Among the combined 13000 word dimensional vectors whichever has the highest number of occurrences, will be selected as a current word of the text summary. Here, 7000-dimensional vectors of the combined vector represent the word "the", therefore, the word "the" is selected as the current word.

In one embodiment, since the second decoder 226 uses a learning-driven technique, it is possible to incrementally update the reinforcement learning (e.g., from feedback provided by a user) so that it can adapt to the text summary. To do so, the second decoder 226 incrementally updates its probability distribution weights during a detection phase (e.g., in response to live user feedback according to required application domains). This feedback may be incorporated immediately in a dynamic online manner to adapt the text summary.

Figure 5B:
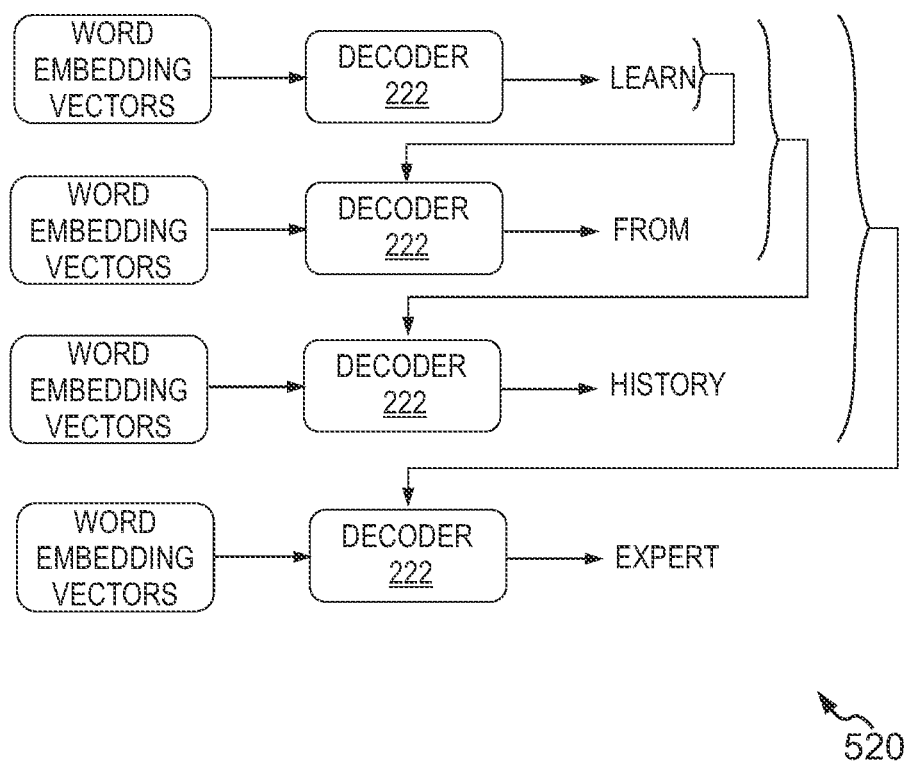
FIG. 5B represents an example representation of a decoding process for generating the domain-specific text summary, in accordance with an example embodiment.

Referring now to FIG. 5B, in conjunction with FIG. 6, an example representation 520 of a decoding process for generating the domain-specific text summary, is shown, in accordance with an embodiment of the present disclosure. The decoder 222 receives word embedding vectors 502 associated with the textual content (as shown in FIG. 6) from the Bert encoder 400.

FIG. 6 is a table 600 showing examples (see 602, 604) of domain-specific text summaries generated by the text summarization system 200 (as shown in FIG. 2) for the text articles, in accordance with an example embodiment. The text summarization system 200 obtains state-of-the-art results in text summarization for the different application domains related text articles, improves the readability and tone of the generated summaries and is better suited to long output sequences.

Referring back to the FIG. 5B, the decoding process of the example 602 (as shown in the FIG. 6) is illustrated. The decoder 222 receives word embedding vectors associated with the text article (i.e., "Travel Back to the 18$^{th}$ century . . ."). At time t=t1, the decoder 222 is configured to generate first and second probability distributions for selection of words as the first word for the text summary. Both the first and second probability distributions are combined using a reinforcement based tunable parameter. The word (i.e., "Learn") having the highest combined probability value is selected as the first word. At time t=t2, the decoder 222 generates the next word (i.e., "from") which has the highest combined probability value at the time t=t2. Thus, by following the similar operations, subsequent words of the text summary can also be generated. In the end, the output text summary is fed into the custom reward calculator (not shown in this figure) which calculates the custom reward score (i.e., "reinforcement loss"). If the custom reward score is low, it means that the bad text summary is generated. The custom reward score (i.e., "reinforcement loss") is fed back to the decoder 222 and is responsible for modifying the second probability distribution of words for generating the domain-specific text summary.

Figure 7:
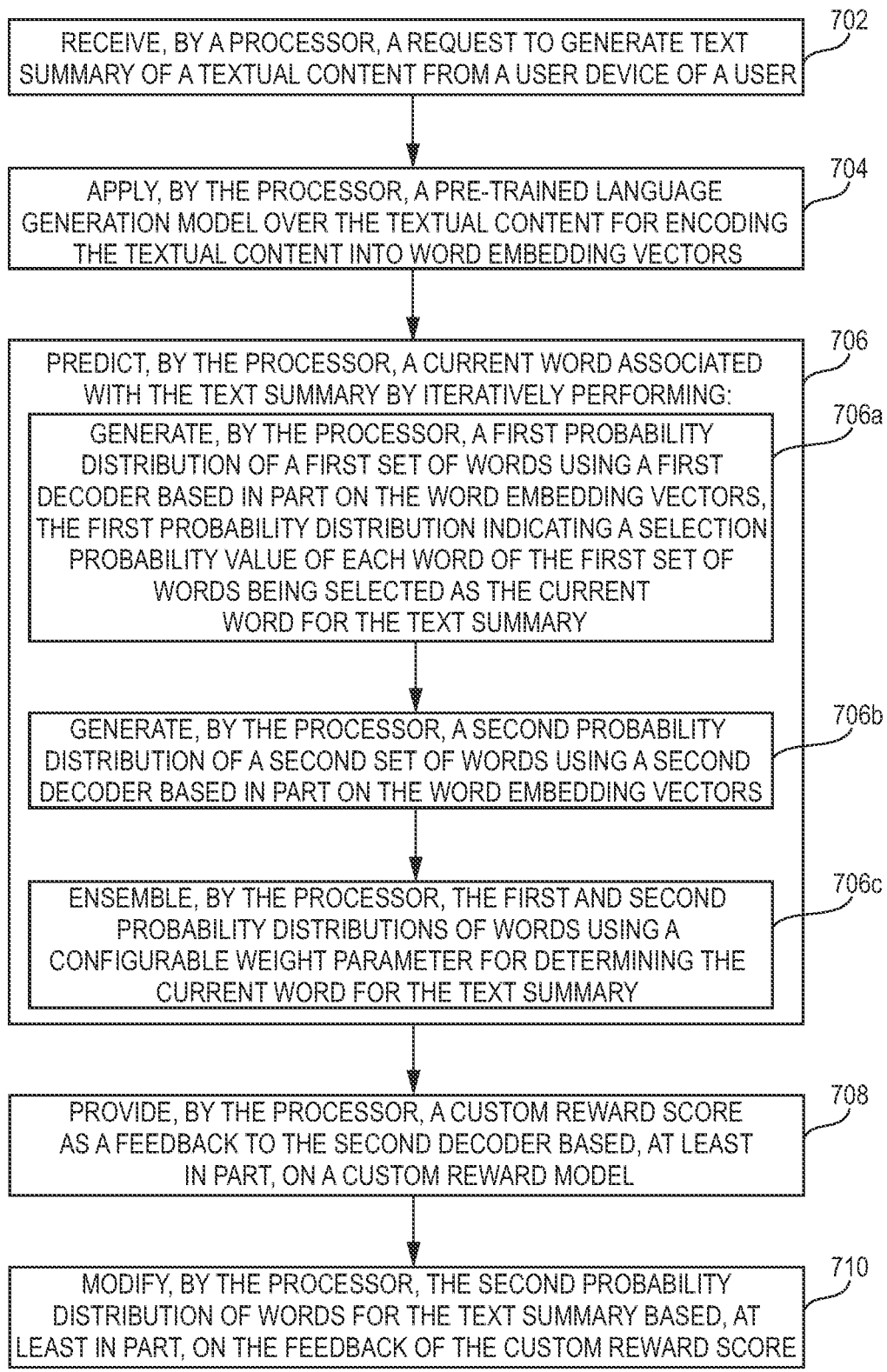
FIG. 7 represents a flow diagram of a computer-implemented method for generating domain-specific text summaries, in accordance with an example embodiment.

FIG. 7 represents a flow diagram of a computer-implemented method 700 for generating domain-specific text summaries, in accordance with an example embodiment. The method 700 depicted in the flow diagram may be executed by the text summarization system 104 or the text summarization system 200. Operations of the method 700, and combinations of operation in the method 700, may be implemented by, for example, hardware, firmware, a processor, circuitry and/or a different device associated with the execution of software that includes one or more computer program instructions. The sequence of operations of the flow diagram of the method 700 may not be necessarily executed in the same order as they are presented. Further, one or more operations may be grouped together and performed in form of a single step, or one operation may have several sub-steps that may be performed in parallel or in sequential manner. The method 700 starts at operation 702.

At the operation 702, the method 700 includes receiving, by the processor 206, a request to generate a text summary of textual content from the user device 112 of the user 102.

At operation 704, the method 700 includes applying, by the processor 206, a pre-trained language generation model (e.g., "Bert model") over the textual content for encoding the textual content into word embedding vectors.

In one example, the text summary may include n sentences (i.e., S={$S_1, S_2 \ldots S_n$}), where first sentence $S_1$ includes m words (i.e., $W_1, W_2, \ldots W_m$).

At operation 706, the method 700 includes predicting, by the processor 206, a current word of each sentence associated with the text summary, by iteratively performing operations 706a, 706b and 706c. According to the above example, at first, the processor 206 is configured to predict the word "$W_1$" of the first sentence and then iteratively predict $W_2$, $W_3 \ldots W_m$ by performing similar operations as followed for predicting the word "$W_1$".

At operation 706a, the method includes generating, by the processor 206, a first probability distribution of a first set of words using the first decoder 224 based in part on the word embedding vectors. The first probability distribution indicates a selection probability value of each word of the first set of words being selected as the current word for the text summary.

At operation 706b, the method includes generating, by the processor 206, a second probability distribution of a second set of words using the second decoder 226 based in part on the word embedding vectors.

At operation 706c, the method includes ensembling, by the processor 206, the first and second probability distributions of words using a configurable weight parameter for determining the current word for the text summary.

At operation 708, the method includes providing, by the processor 206, a custom reward score as a feedback to the second decoder 226 based, at least in part, on a custom reward model. In one embodiment, the custom reward score is summary-level rewards. In other words, the custom reward score is calculated after generating the text summary.

At operation 710, the method includes modifying, by the processor 206, the second probability distribution of words for the text summary based, at least in part, on the feedback of the custom reward score.

Figure 8:
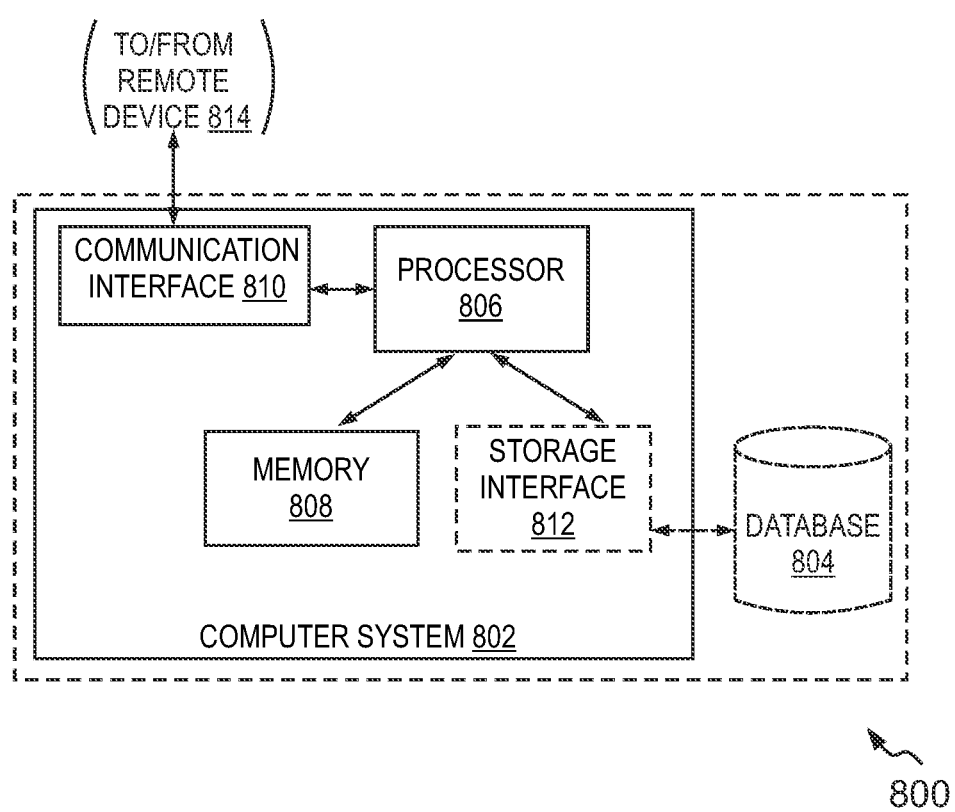
FIG. 8 is a simplified block diagram of a server system, in accordance with an example embodiment of the present disclosure.

FIG. 8 is a simplified block diagram of a server system 800 for generating domain-specific text summaries, in accordance with an embodiment of the present disclosure. The server system 800 may include the text summarization system 104 or the text summarization system 200. The server system 800 includes a computer system 802 and a database 804. The computer system 802 includes at least one processor 806 configured to execute executable instructions for providing various features of the present disclosure. The executing instructions are stored in a memory 808. The components of the computer system 802 provided herein may not be exhaustive and that the computer system 802 may include more or fewer components than that of depicted in FIG. 8. Further, two or more components may be embodied in one single component, and/or one component may be configured using multiple sub-components to achieve the desired functionalities. Some components of the computer system 802 may be configured using hardware elements, software elements, firmware elements and/or a combination thereof.

The processor 806 is operatively coupled to a communication interface 810 such that the computer system 802 is capable of communicating with a remote device 814 such as the user device 112, the textual content database 108, respectively or communicated with any entity connected to the network 106 (shown in FIG. 1).

In other embodiments, the database 804 is external to the computer system 802 and may be accessed by the computer system 802 using a storage interface 812. The database 804 may also include pre-trained language generation model and reinforcement learning models. The database 804 may include multiple storage units such as hard disks and/or solid-state disks in a redundant array of inexpensive disks (RAID) configuration. The database 804 may include a storage area network (SAN) and/or a network attached storage (NAS) system.

In some embodiments, the database 804 is integrated within computer system 802. For example, the computer system 802 may include one or more hard disk drives as the database 804. The storage interface 812 is any component capable of providing the processor 806 with access to the database 804. The storage interface 812 may include, for example, an Advanced Technology Attachment (ATA) adapter, a Serial ATA (SATA) adapter, a Small Computer System Interface (SCSI) adapter, a RAID controller, a SAN adapter, a network adapter, and/or any component providing the processor 806 with access to the database 804.

The server system 800 may also perform similar operations as performed by the text summarization system 200 for generating domain-specific text summaries by utilizing the pre-trained language generation model as encoding model and adding reinforcement based feedback layer for modifying probability distribution of words predicted by a fine-tuned decoder. For the sake of brevity, the detailed explanation of the server system 800 is omitted herein with reference to the FIG. 2.

Figure 9:
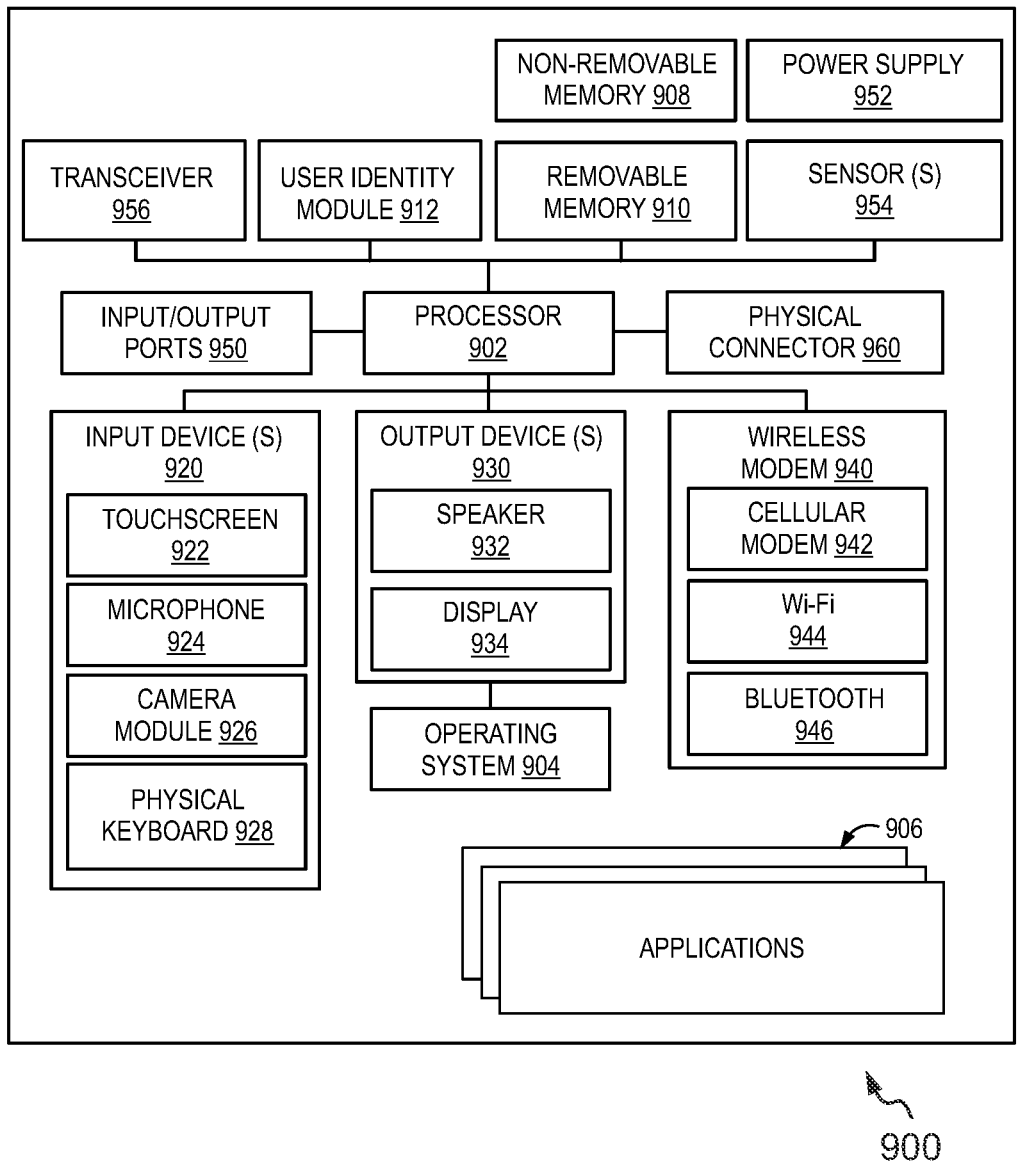
FIG. 9 is a simplified block diagram of a user device associated with a user capable of implementing at least some embodiments of the present disclosure.

FIG. 9 shows a simplified block diagram of a user device 900, for example, a mobile phone or a desktop computer capable of implementing the various embodiments of the present disclosure. For example, the user device 900 may correspond to the user device 112 associated with the user 102 who requests for domain-specific text summary of an article. The user device 900 is depicted to include one or more applications 906 (e.g., "text summarization application"). The applications 906 can be an instance of an application downloaded from a third-party server.

It should be understood that the user device 900 as illustrated and hereinafter described is merely illustrative of one type of device and should not be taken to limit the scope of the embodiments. As such, it should be appreciated that at least some of the components described below in connection with the user device 900 may be optional and thus in an example embodiment may include more, less or different components than those described in connection with the example embodiment of the FIG. 9. As such, among other examples, the user device 900 could be any of a mobile electronic device, for example, cellular phones, tablet computers, laptops, mobile computers, personal digital assistants (PDAs), mobile televisions, mobile digital assistants, or any combination of the aforementioned, and other types of communication or multimedia devices.

The illustrated user device 900 includes a controller or a processor 902 (e.g., a signal processor, microprocessor, ASIC, or other control and processing logic circuitry) for performing such tasks as signal coding, data processing, image processing, input/output processing, power control, and/or other functions. An operating system 904 controls the allocation and usage of the components of the user device 900. In addition, the applications 906 may include common server performance monitoring applications or any other computing application.

The illustrated user device 900 includes one or more memory components, for example, a non-removable memory 908 and/or removable memory 910. The non-removable memory 908 and/or the removable memory 910 may be collectively known as a database in an embodiment. The non-removable memory 908 can include RAM, ROM, flash memory, a hard disk, or other well-known memory storage technologies. The removable memory 910 can include flash memory, smart cards, or a Subscriber Identity Module (SIM). The one or more memory components can be used for storing data and/or code for running the operating system 904 and the applications 906. The user device 900 may further include a user identity module (UIM) 912. The UIM 912 may be a memory device having a processor built in. The UIM 912 may include, for example, a subscriber identity module (SIM), a universal integrated circuit card (UICC), a universal subscriber identity module (USIM), a removable user identity module (R-UIM), or any other smart card. The UIM 912 typically stores information elements related to a mobile subscriber. The UIM 912 in form of the SIM card is well known in Global System for Mobile (GSM) communication systems, Code Division Multiple Access (CDMA) systems, or with third-generation (3G) wireless communication protocols such as Universal Mobile Telecommunications System (UMTS), CDMA9000, wideband CDMA (WCDMA) and time division-synchronous CDMA (TD-SCDMA), or with fourth-generation (4G) wireless communication protocols such as LTE (Long-Term Evolution).

The user device 900 can support one or more input devices 920 and one or more output devices 930. Examples of the input devices 920 may include, but are not limited to, a touch screen/a display screen 922 (e.g., capable of capturing finger tap inputs, finger gesture inputs, multi-finger tap inputs, multi-finger gesture inputs, or keystroke inputs from a virtual keyboard or keypad), a microphone 924 (e.g., capable of capturing voice input), a camera module 926 (e.g., capable of capturing still picture images and/or video images) and a physical keyboard 928. Examples of the output devices 930 may include, but are not limited to a speaker 932 and a display 934. Other possible output devices can include piezoelectric or other haptic output devices. Some devices can serve more than one input/output function. For example, the touch screen 922 and the display 934 can be combined into a single input/output device.

A wireless modem 940 can be coupled to one or more antennas (not shown in the FIG. 9) and can support two-way communications between the processor 902 and external devices, as is well understood in the art. The wireless modem 940 is shown generically and can include, for example, a cellular modem 942 for communicating at long range with the mobile communication network, a Wi-Fi compatible modem 944 for communicating at short range with an external Bluetooth-equipped device or a local wireless data network or router, and/or a Bluetooth-compatible modem 946. The wireless modem 940 is typically configured for communication with one or more cellular networks, such as a GSM network for data and voice communications within a single cellular network, between cellular networks, or between the user device 900 and a public switched telephone network (PSTN).

The user device 900 can further include one or more input/output ports 950, a power supply 952, one or more sensors 954, for example, an accelerometer, a gyroscope, a compass, or an infrared proximity sensor for detecting the orientation or motion of the user device 900 and biometric sensors for scanning biometric identity of an authorized user, a transceiver 956 (for wirelessly transmitting analog or digital signals) and/or a physical connector 960, which can be a USB port, IEEE 1294 (FireWire) port, and/or RS-232 port. The illustrated components are not required or all-inclusive, as any of the components shown can be deleted and other components can be added.

The disclosed method with reference to FIG. 7, or one or more operations performed by the text summarization system 200 may be implemented using software including computer-executable instructions stored on one or more computer-readable media (e.g., non-transitory computer-readable media, such as one or more optical media discs, volatile memory components (e.g., DRAM or SRAM), or nonvolatile memory or storage components (e.g., hard drives or solid-state nonvolatile memory components, such as Flash memory components) and executed on a computer (e.g., any suitable computer, such as a laptop computer, net book, Web book, tablet computing device, smart phone, or other mobile computing device). Such software may be executed, for example, on a single local computer or in a network environment (e.g., via the Internet, a wide-area network, a local-area network, a remote web-based server, a client-server network (such as a cloud computing network), or other such network) using one or more network computers. Additionally, any of the intermediate or final data created and used during implementation of the disclosed methods or systems may also be stored on one or more computer-readable media (e.g., non-transitory computer-readable media) and are considered to be within the scope of the disclosed technology. Furthermore, any of the software-based embodiments may be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

Although the invention has been described with reference to specific exemplary embodiments, it is noted that various modifications and changes may be made to these embodiments without departing from the broad spirit and scope of the invention. For example, the various operations, blocks, etc., described herein may be enabled and operated using hardware circuitry (for example, complementary metal oxide semiconductor (CMOS) based logic circuitry), firmware, software and/or any combination of hardware, firmware, and/or software (for example, embodied in a machine-readable medium). For example, the apparatuses and methods may be embodied using transistors, logic gates, and electrical circuits (for example, application specific integrated circuit (ASIC) circuitry and/or in Digital Signal Processor (DSP) circuitry).

Particularly, the text summarization system 200 and its various components may be enabled using software and/or using transistors, logic gates, and electrical circuits (for example, integrated circuit circuitry such as ASIC circuitry). Various embodiments of the invention may include one or more computer programs stored or otherwise embodied on a computer-readable medium, wherein the computer programs are configured to cause a processor or computer to perform one or more operations. A computer-readable medium storing, embodying, or encoded with a computer program, or similar language, may be embodied as a tangible data storage device storing one or more software programs that are configured to cause a processor or computer to perform one or more operations. Such operations may be, for example, any of the steps or operations described herein. In some embodiments, the computer programs may be stored and provided to a computer using any type of non-transitory computer readable media. Non-transitory computer readable media include any type of tangible storage media. Examples of non-transitory computer readable media include magnetic storage media (such as floppy disks, magnetic tapes, hard disk drives, etc.), optical magnetic storage media (e.g. magneto-optical disks), CD-ROM (compact disc read only memory), CD-R (compact disc recordable), CD-R/W (compact disc rewritable), DVD (Digital Versatile Disc), BD (BLU-RAY® Disc), and semiconductor memories (such as mask ROM, PROM (programmable ROM), EPROM (erasable PROM), flash memory, RAM (random access memory), etc.). Additionally, a tangible data storage device may be embodied as one or more volatile memory devices, one or more non-volatile memory devices, and/or a combination of one or more volatile memory devices and non-volatile memory devices. In some embodiments, the computer programs may be provided to a computer using any type of transitory computer readable media. Examples of transitory computer readable media include electric signals, optical signals, and electromagnetic waves. Transitory computer readable media can provide the program to a computer via a wired communication line (e.g., electric wires, and optical fibers) or a wireless communication line.

Various embodiments of the invention, as discussed above, may be practiced with steps and/or operations in a different order, and/or with hardware elements in configurations, which are different than those which, are disclosed. Therefore, although the invention has been described based upon these exemplary embodiments, it is noted that certain modifications, variations, and alternative constructions may be apparent and well within the spirit and scope of the invention.

Although various exemplary embodiments of the invention are described herein in a language specific to structural features and/or methodological acts, the subject matter defined in the appended claims is not necessarily limited to the specific features or acts described above. Rather, the specific features and acts described above are disclosed as exemplary forms of implementing the claims.

What is claimed is:

1. A computer-implemented method for generating a text summary, the computer-implemented method comprising:
receiving, by a processor, a request to generate the text summary of a textual content from a user device of a user;
applying, by the processor, a pre-trained language generation model over the textual content for encoding the textual content into word embedding vectors;
predicting, by the processor, a current word associated with the text summary, by iteratively performing:
generating, by the processor, a first probability distribution of a first set of words using a first decoder based in part on the word embedding vectors, the first probability distribution indicating a selection probability value of each word of the first set of words being selected as the current word for the text summary,
generating, by the processor, a second probability distribution of a second set of words using a second decoder based in part on the word embedding vectors, and
ensembling, by the processor, the first and second probability distributions of words using a configurable weight parameter for determining the current word for the text summary;
providing, by the processor, a custom reward score as a feedback to the second decoder based, at least in part, on a custom reward model;
modifying, by the processor, the second probability distribution of words for the text summary based, at least in part, on the feedback of the custom reward score; and updating, by the processor, the text summary, based at least in part on the modified second probability distribution of the words, to incorporate domain-specific requirements.

2. The computer-implemented method of claim 1, further comprising:
receiving, by the processor, the textual content, to be processed to generate the text summary, from a textual content database.

3. The computer-implemented method of claim 1, wherein the custom reward score generated after the updated text summary is maximized.

4. The computer-implemented method of claim 1, wherein the configurable weight parameter is adapted based at least in part on the domain-specific requirements in the text summary, and wherein the configurable weight parameter is trained using reinforcement machine learning algorithms.

5. The computer-implemented method of claim 1, further comprising:
selecting, by the processor, a word having a peak combined probability value as the current word of the text summary.

6. The computer-implemented method of claim 1, further comprising:
calculating, by the processor, the custom reward score based, at least in part, on a generated text summary, wherein the custom reward score is summary-level rewards.

7. The computer-implemented method of claim 1, wherein the custom reward model is a reinforcement machine learning based model and trained based at least on domain-specific datasets.

8. The computer-implemented method of claim 1, wherein the pre-trained language generation model is bidirectional encoder representation from transformers (Bert) language generation model.

9. A text summarization system for generating a text summary, the text summarization system comprising:
a communication interface;
a memory comprising executable instructions; and
a processor communicably coupled to the communication interface, the processor configured to execute the executable instructions to cause the text summarization system to at least:
receive a request to generate the text summary of a textual content from a user device of a user,
apply a pre-trained language generation model over the textual content for encoding the textual content into word embedding vectors,
predict a current word associated with the text summary, by iteratively performing:
generating a first probability distribution of a first set of words using a first decoder based in part on the word embedding vectors, the first probability distribution indicating a selection probability value of each word of the first set of words being selected as the current word for the text summary,
generating a second probability distribution of a second set of words using a second decoder based in part on the word embedding vectors, and
ensembling the first and second probability distributions of words using a configurable weight parameter for determining the current word for the text summary,
provide a custom reward score as a feedback to the second decoder based, at least in part, on a custom reward model,
modify the second probability distribution of words for the text summary based, at least in part, on the feedback of the custom reward score, and
update the text summary, based at least in part on the modified second probability distribution of the words, to incorporate domain-specific requirements.

10. The text summarization system of claim 9, wherein the text summarization system is further caused at least in part to receive the textual content, to be processed to generate the text summary, from a textual content database.

11. The text summarization system of claim 9, wherein the custom reward score generated after the updated text summary is maximized.

12. The text summarization system of claim 9, wherein the configurable weight parameter is adapted based at least in part on domain-specific requirements in the text summary, and wherein the configurable weight parameter is trained using reinforcement machine learning algorithms.

13. The text summarization system of claim 9, wherein the text summarization system is further caused at least in part to select a word having a peak combined probability value as the current word of the text summary.

14. The text summarization system of claim 9, wherein the text summarization system is further caused at least in part to calculate the custom reward score based, at least in part, on generated sentences of the text summary, wherein the custom reward score is calculated after each sentence prediction, and wherein the custom reward score is sentence-level rewards.

15. The text summarization system of claim 9, wherein the custom reward model is a reinforcement machine learning based model and trained based at least on domain-specific datasets.

16. The text summarization system of claim 9, wherein the pre-trained language generation model is bidirectional encoder representation from transformers (Bert) language generation model.

17. A text summarization system for generating a text summary, the text summarization system comprising:
an encoder configured to encode a textual content, to be summarized, into word embedding vectors using a pre-trained language generation model;
a decoder configured to predict a current word associated with the text summary, the decoder comprising a base decoder and a fine-tuned decoder;
an ensemble manager,
wherein, at each iteration of predicting the current word,
the base decoder is configured to generate a first probability distribution of a first set of words based, at least in part, on the word embedding vectors, the first probability distribution indicating a selection probability value of each word of the first set of words being selected as the current word for the text summary,
the fine-tuned decoder is configured to generate a second probability distribution of a second set of words based, at least in part, on the word embedding vectors, and
the ensemble manager is configured to ensemble the first and second probability distributions of words based, at least in part, on a configurable weight parameter for determining the current word for the text summary; and
a custom reward calculator configured to:

provide a custom reward score as a feedback to the fine-tuned decoder based, at least in part, on a custom reward model;

modify the second probability distribution of words for the text summary based, at least in part, on the feedback of the custom reward score; and update the text summary, based at least in part on the modified second probability distribution of the words, to incorporate domain-specific requirements.

18. The text summarization system of claim 17, wherein the configurable weight parameter is adapted based, at least in part, on the domain-specific requirements in the text summary, and wherein the configurable weight parameter is trained using reinforcement machine learning algorithms.

19. The text summarization system of claim 17, wherein the text summarization system is configured to select a word having a peak combined probability value as the current word of the text summary.

20. The text summarization system of claim 17, wherein the custom reward calculator is configured to calculate the custom reward score based, at least in part, on generated content of the text summary, and wherein the custom reward score is summary-level rewards.

* * * * *